(No Model.)

D. HUMPHREY.
HOE.

No. 275,915.  Patented Apr. 17, 1883.

WITNESSES.
James T. Dorsey.
A. E. Leavitt.

INVENTOR.
Dennison Humphrey,
By Sylvenus Walker
Attorney

UNITED STATES PATENT OFFICE.

DENNISON HUMPHREY, OF CROYDON, ASSIGNOR OF ONE-HALF TO FRANK A. SIBLEY, OF NEWPORT, NEW HAMPSHIRE.

HOE.

SPECIFICATION forming part of Letters Patent No. 275,915, dated April 17, 1883.

Application filed November 6, 1882. (No model.)

*To all whom it may concern:*

Be it known that I, DENNISON HUMPHREY, of Croydon, in the county of Sullivan and State of New Hampshire, have invented certain new and useful Improvements in Hoes, of which the following is a specification.

The object of my invention is to provide a cheap, simple, convenient, and durable hoe which shall be adapted to enter the soil with less power applied thereto than those heretofore constructed having whole blades, and yet be capable of removing the soil in the act of hoeing as expeditiously as those heretofore constructed and in general use.

Figure 1:
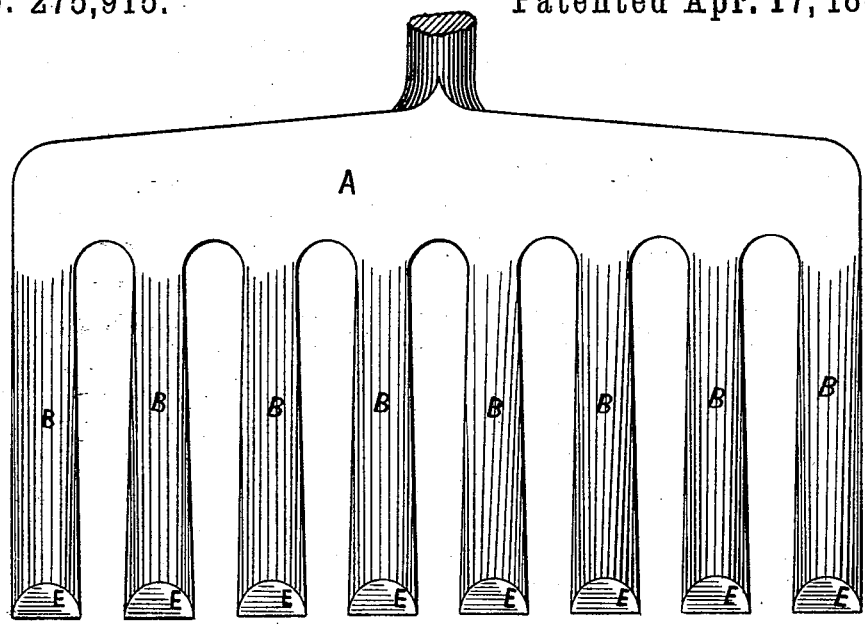
Figure 2:
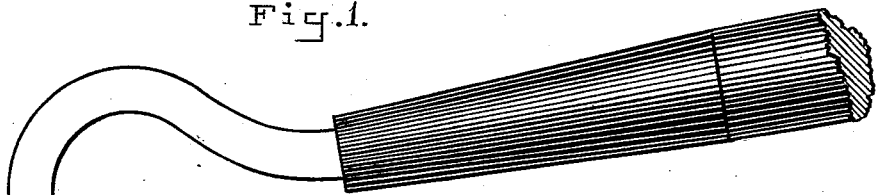
Figure 3:
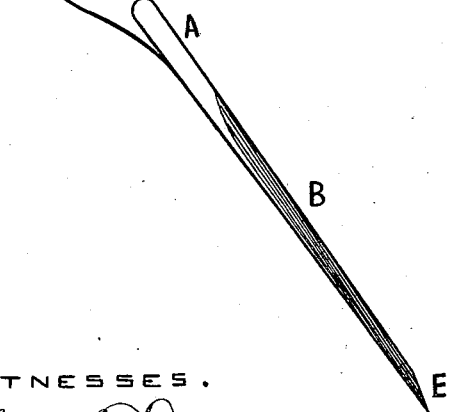

Figure 1 represents a front elevation of a hoe constructed according to my invention. Fig. 2 represents an end or side elevation of the same. Fig. 3 represents a cross-section of one of the prongs.

A represents the body portion or back of the hoe, and is provided with a series of prongs, B, formed oval or rounded upon their front faces and beveled off at their lower cutting ends, E, leaving their rear faces flat, and all throughout upon the same plane as the rear of said back A. These prongs B taper slightly from their lower ends, E, upward to near their intersection with the said back portion A, and are of corresponding width with the intervening spaces, each being about one-half an inch in width, which construction permits two hoe-blanks to be cut from a sheet of steel without waste, as the prongs of one form the spaces of the other when the two are cut apart. Then their oval form being produced by a drop or press, which reduces their thickness toward their lower ends and increases their width in proportion, leaves the finished hoe with prongs, substantially as shown, their ends being beveled from front to rear, and square or all on a straight line, by which construction it will be seen that such square-ended prongs are each adapted to remove the soil as such prongs are drawn or forced into the same, and that the intervening spaces between the prongs are so narrow that the usual moisture of the soil will hold the same together sufficiently to permit the hoe to carry or remove all or nearly all the soil that may be drawn or forced upon the same from one edge to the other, or upon the extreme width of the hoe from the two outer prongs, as but little will fall through the spaces, so as to serve the purposes of a full-blade hoe, and that the formation of the spaces, being narrowest at the edge or ends of the prongs, permits any stones or other hard substances to pass between the ends of the prongs and not clog or stick between the same as they are forced over the said obstructions, allowing such to slip between the prongs and pass through to the rear.

I am well aware that pronged hoes are old and well known, and that weeding-hoes of various forms have heretofore been constructed. Therefore I do not broadly claim such invention, but limit my invention to the precise construction herein shown and described.

Having thus described my invention, I claim—

The hoe consisting of the back portion A, having a series of prongs, B, formed tapering from their lower ends, E, upward, and with oval front faces and rectangular ends beveled from front to rear, substantially as shown and described, as and for the purposes set forth.

DENNISON HUMPHREY.

Witnesses:
GEORGE R. BROWN,
RANSOM SEVERNS.